(12) United States Patent
Heitlinger et al.

(10) Patent No.: US 9,480,197 B2
(45) Date of Patent: Nov. 1, 2016

(54) STABILIZER FOR A LOWER LINK OF A THREE-POINT HITCH

(71) Applicant: Deere & Company, Moline, IL (US)

(72) Inventors: Martin Heitlinger, Oestringen (DE); Hanko Onken, Mannheim (DE); Klaus Mayer, Hesseneck-Kailbach (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/662,873

(22) Filed: Mar. 19, 2015

(65) Prior Publication Data
US 2015/0264856 A1   Sep. 24, 2015

(30) Foreign Application Priority Data
Mar. 21, 2014   (DE) .................. 10 2014 205 281

(51) Int. Cl.
*A01B 59/041* (2006.01)
*B60D 1/34* (2006.01)

(52) U.S. Cl.
CPC .......... *A01B 59/0415* (2013.01); *A01B 59/041* (2013.01)

(58) Field of Classification Search
CPC ........ A01B 59/041; B60D 1/24; B60D 1/32; B60D 1/34
USPC ......................................... 172/439, 450, 443
See application file for complete search history.

(56) References Cited

U.S. PATENT DOCUMENTS

| | | | | |
|---|---|---|---|---|
| 3,503,625 A * | 3/1970 | Fendt | ..................... | A01B 59/00 172/450 |
| 4,191,280 A * | 3/1980 | Copperwheat | ....... | A01B 59/004 172/439 |
| 4,582,337 A * | 4/1986 | Hsueh | ..................... | B60D 1/34 280/455.1 |
| 5,462,303 A * | 10/1995 | Langen | ................ | A01B 59/041 172/450 |
| 6,286,853 B1 * | 9/2001 | Lauzon | .................... | B60D 1/50 267/138 |
| 8,851,199 B2 * | 10/2014 | Sauermann | ........ | A01B 59/0415 172/439 |
| 9,155,238 B2 * | 10/2015 | Sauermann | .......... | A01B 59/041 |
| 9,179,590 B2 * | 11/2015 | Heitlinger | ............ | A01B 59/041 |
| 9,221,313 B2 * | 12/2015 | Heitlinger | ............ | A01B 59/041 |
| 2012/0153552 A1 | 6/2012 | Sauermann | | |

FOREIGN PATENT DOCUMENTS

| | | |
|---|---|---|
| DE | 4310027 | 7/1994 |
| DE | 102011081274 | 2/2013 |
| EP | 1342399 | 9/2003 |
| EP | 2232973 | 2/2013 |

OTHER PUBLICATIONS

German Search Report issued in counterpart application No. 102014205281.5 dated Sep. 3, 2015 (5 pages).

* cited by examiner

*Primary Examiner* — Gary Hartmann (57) ABSTRACT

A stabilizer for a lower link of a three-point hitch of a tractor, includes a first stabilizer element and a second stabilizer element, which is supported so it can move with spring action relative to the first stabilizer element along a common longitudinal axis. A first limiting member is connected with the first stabilizer element, which in a closed position forms a first stop which interacts with the second stabilizer element to limit compression movement between the two stabilizer elements. A second limiting member between the two stabilizer elements forms a second stop to limit the compression movement relative to a corresponding end stop of the stabilizer when the first limiting member is brought into an opened position.

13 Claims, 10 Drawing Sheets

STABILIZER FOR A LOWER LINK OF A THREE-POINT HITCH

TECHNICAL FIELD

The present disclosure relates to a stabilizer for a lower link of a three-point hitch of a tractor.

BACKGROUND

A stabilizer for a lower link of a three-point hitch on a tractor is known, for example, from EP 2 232 973 A2. The hinged stabilizer between a rear fastening site of the tractor and a lower link of the three-point hitch includes a first and a second stabilizer element, wherein the two stabilizer elements are conducted for movement into one another in a longitudinal direction so that they can deflect, relative to one another, against a resetting spring force. A closing flap, placed on the first stabilizer element so it can swivel, is used to limit a compression movement between the two stabilizer elements. The closing flap forms, in a closed position, a unilateral stop area, which interacts with a limiting collar of the second stabilizer element. If the closing flap of the stabilizer is moved to an opened position, then the two stabilizer elements are able to carry out an essentially free compression movement, whose scope is limited merely by a corresponding construction-related and, in this respect, a stationary end stop within the stabilizer. Depending on the position of the closing flap, therefore, it is possible to either completely block a lateral movement of a lower link equipped with the stabilizer or to release it within the scope of the structural conditions of the stabilizer. It is desired to provide a stabilizer which is improved with respect to its adaptation possibilities.

SUMMARY

According to an aspect of the present disclosure, a stabilizer for a lower link of a three-point hitch of a tractor comprises a first stabilizer element and a second stabilizer element, which, relative to the first stabilizer element, is supported to move with a spring action along a common longitudinal axis. A first limiting member is connected with the first stabilizer element. The first limiting member, in a closed position, forms a first stop that interacts with the second stabilizer element to limit a compression movement between the two stabilizer elements. A second limiting member is provided between the two stabilizer elements. The second limiting member forms a second stop to limit the compression movement, relative to a corresponding end stop of the stabilizer, when the first limiting member is brought to an opened position.

In other words, the two stops make it possible to limit, to a varying extent, a compression movement between the two stabilizer elements, and thus, in several steps, relative to a corresponding construction-related and, in this respect, to a stationary end stop of the stabilizer, so that the permissible lateral movement of a lower link equipped with the stabilizer can adapt flexibly to various applications in the field. Thus, for example, the operation of a plow generally requires higher lateral deflection capacity of the lower links than the use of a chisel plow or the like.

The first stabilizer element is, in particular, an essentially cylindrical stabilizer housing, in which the second stabilizer element, designed as the spring piston, is conducted for longitudinal movement. A suspension mechanism located within the stabilizer housing presses the spring piston and thus the second stabilizer element into a pre-specified position at rest, and thus to make possible a self-centering of a lower link equipped with the stabilizer.

The stabilizer can be the so-called single-acting type. This means that it permits a stage-wise limitation of only one compression movement between the two stabilizer elements, but not an extension movement. In order to be able to limit the permissible lateral movement of an implement placed on the three-point hitch in both directions, therefore, each of the two lower links of the three-point hitch is coordinated with a separate stabilizer, working in an opposite direction.

Advantageously, the first limiting member is designed as an outer closing flap, and the second limiting member as an inner closing flap, wherein the two limiting member are connected with the first stabilizer element so that they can swivel on a rotational axis running transverse to the longitudinal axis of the stabilizer. For the stepwise release of the stabilizer, the outer closing flap first has to swivel and then the inner closing flap, from a closed to an opened position. The second stop, formed by the inner closing flap, hereby permits a compression movement between the two stabilizer elements that is larger in comparison to the one by the first stop that is formed by the outer closing flap.

The inner closing flap is spatially located between the outer closing flap and the first stabilizer element, if the outer closing flap is in the closed position. At least in sections, a form- and/or a force-locking can thereby be produced between the adjacent contours of the aforementioned parts.

Advantageously, the first and/or the second stops is/are formed by a flattening provided on the front on the outer and/or inner closing flaps. The flattening provided on the front represents a unilateral stop area for a counter bearing constructed on the second stabilizer element in the shape of a surrounding limiting collar. A compression movement of the two stabilizer elements is permitted to the extent that there is contact between the limiting collar and the individual unilateral stop area of the outer or inner closing flap.

In the sense of a compact design of the stabilizer, it is conceivable that the closing flaps are connected, with economy of space, with the first stabilizer element so that they swivel around a common rotational axis. The rotational axis can, for example, be formed by a hinge pin that extends through the first stabilizer element, on whose free end, for the creation of a swiveling connection, the two closing flaps are supported so they rotate by means of corresponding outer and inner strap hinges.

In particular, in the closed position, the outer closing flap may at least partially encloses both the inner closing flap as well as the first stabilizer element, which will produce an improved protection from soiling from the outside. For this purpose, the outer closing flap can have the shape of a half-shell, encompassing, in sections, the inner closing flap and the first stabilizer element in their closed position. A similar development is also conceivable with regard to the inner closing flap, so that in their closed positions, the two closing flaps protect at least the first stabilizer element, including a suspension mechanism accommodated therein, from the penetration of undesired soiling from the outside.

The outer closing flap can be connected with a rear fastening site of the tractor via a tension strap with a hoist rope or a hoist chain such that it can be brought into the closed position automatically upon lifting the lower link. This is advantageous, above all, when carrying out transporting trips, since here, an uncontrolled back and forth swinging of an implement attached to the three-point hitch should be prevented if possible.

Moreover, there can be a hitch element placed on the inner closing flap, by means of which the inner closing flap, together with the outer closing flap, can be brought from a closed position into an opened position. The hitch element can, for example, have the shape of a projection constructed on the inner closing flap, which extends through an opening provided on an upper side of the outer closing flap, and by means of which a securing element in the shape of a removable splint is stuck; its dimensions are selected larger in comparison to the opening in such a way that it moves along the inner closing flap into the opened position when the outer closing flap is lifted.

The two closing flaps can be bent components or castings made of steel. The bent component or casting can have a reinforced stop area, so that increased stresses, as they occur in the case of heavy implements, can be correspondingly taken into consideration.

In accordance with a possible alternative development of the stabilizer, the second limiting member is designed as a stop pin to variably limit the compression movement, which can be adjusted along the longitudinal axis of the stabilizer. This makes it possible to adapt the position of the second stop in a gradual manner, and thus the permissible scope of a compression movement between the two stabilizer elements in a deflection range that is found between the first stop and the corresponding end stop of the stabilizer. The first limiting member can be a conventional closing flap, wherein for the release of the stop bolt and thus, the second stop, it is first brought from the closed into the opened position.

The second stop can be formed by a free end of the stop pin. Stated more precisely, the free end can be a unilateral stop area for a counter bearing constructed within the second stabilizer element in the shape of a central impact base. A compression movement between the two stabilizer elements is permissible until there is contact between the central impact base and the free end of the stop pin.

In particular, the stop pin can be designed as a threaded pin. The threaded pin comprises a threaded section with an outer thread that meshes along the longitudinal axis of the second stabilizer element of the provided complementary inner thread, wherein the position of the free end can be changed by the rotating the threaded pin in or out. For this purpose, the threaded pin can have a tool holder in the shape of a socket drive, or something similar, on its opposite end.

Furthermore, the threaded pin can be protected against loss, which limits the adjusting capacity. In the simplest case, it can be protected by a locking screw that runs transverse to the adjusting direction of the threaded pin, and which prevents an excess unscrewing of the threaded pin from the inner thread of the second stabilizer element.

The stop pin may also be supported so it can be moved within a guide borehole constructed along the longitudinal axis of the second stabilizer element. The threaded section provided for the adjustment of the stop pin can be constructed, in this case, on a separate threaded pin impinging on the stop pin.

A movement-inhibiting locking element may be used to prevent an unintended adjustment of the stop pin as a result of operation-caused vibrations or the like. This is, for example, constructed as a rubber-elastic O-ring, introduced into a circumferential grove of the stop pin, which is pre-compressed within the guide borehole of the stop pin so that it makes a displacement of the stop pin within the guide borehole difficult as a result of the frictional forces thus produced.

In accordance with another possible alternative development of the stabilizer, the second limiting member is an intermediate ring located between the two stabilizer elements. The second stop can, in this case, be formed by a flattening provided on the front side on the intermediate ring. This is a unilateral stop area for a counter support constructed on the second stabilizer element in the shape of a surrounding limiting collar. A compression movement of the two stabilizer elements is permissible until there is contact between the limiting collar and the flattening provided on the front side. This means that, depending on the thickness of the intermediate ring used, it is possible to limit, in varying degrees, a compression movement of the two stabilizer elements. The limiting member can be a conventional closing flap wherein for the release of the intermediate ring and thus of the second stop, it has to first be brought from the closed into the opened position.

For an easier assembling or dismantling, the intermediate ring can first be constructed in at least two parts. An assembly element in the shape of a spring-secured splint or a screw connection is hereby used for the detachable connection of the at least two parts on the first stabilizer element.

Furthermore, the intermediate ring may have an inner thread that can be screwed on an outer thread that is constructed in an end area of the first stabilizer element, so that the position of the second stop can be adapted in a gradual manner by a corresponding screwing on or off of the intermediate ring. Here too, the intermediate ring can be constructed in two parts, wherein it can be braced by means of the assembly element with the outer thread of the first stabilizer element in such a way that it is secured against an unintended turning.

Finally, the use of the intermediate ring can also be basically adjusted in connection with a hydraulic stabilizer so that a compression movement appearing on it can be limited in an appropriate manner.

DETAILED DESCRIPTION OF THE DRAWINGS

At least one example embodiment of the subject matter of this disclosure is understood by referring to FIGS. 1 through 9 of the drawings. Components that match or that are similar with regard to their function are marked with identical reference symbols.

Figure 1:
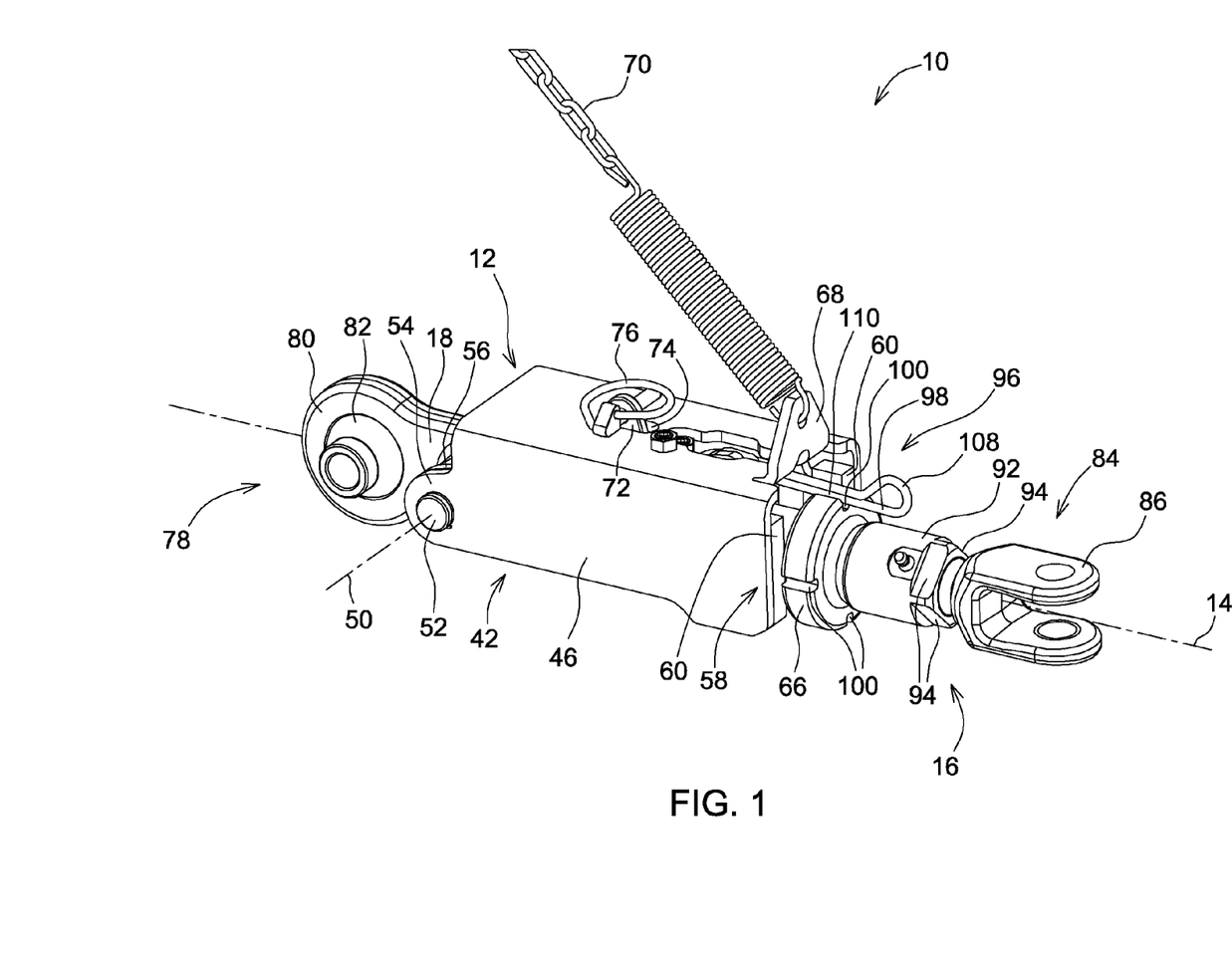
FIG. 1 is a perspective view of an embodiment example of the stabilizer in accordance with the invention for a lower link of a three-point hitch of a tractor.

Referring to FIG. 1, the stabilizer 10 includes a first stabilizer element 12 and a second stabilizer element 16, which is supported so it moves with a spring action along a common longitudinal axis 14, opposite the first stabilizer element 12. The first stabilizer element 12 is an essentially cylindrical stabilizer housing 18, within which the second stabilizer element 16, which is constructed as a spring piston 20, is guided so it can move longitudinally, wherein the spring piston 20 is a component of a spring mechanism, which is described below with reference to FIGS. 2-4.

The spring piston 20 has a piston section 22 with a reduced diameter, on which a first stop ring 24 is placed in a first end area so it can slide. The first stop ring 24 is secured by means of spring ring 26, which meshes into a groove, which is formed circumferentially on the piston section 22. Moreover, a second stop ring 28 is placed in a second area so it can slide. The second stop ring 28 is supported on a collar 30 which is formed on the spring piston 20. A snap ring 32, introduced into the stabilizer housing 18, and a spacer 34 are used together with the first and second stop rings 24 and 28 to limit compression and extension movements of the spring piston 20, and consequently form corresponding construction-related and, in that respect, stationary end stops 36 and 38 of the stabilizer 10. A spiral spring 40, surrounding the piston section 22, extends between the two stop rings 24 and 28. The spiral spring 40 is compressed or pre-stressed by means of the two stop rings 24 and 28 so that the spring piston 20, and thus, the second stabilizer element 16, is pressed into a pre-specified position at rest, so as to thus make possible a self-centering of a lower link equipped with the stabilizer 10.

It should be noted that the representation of the first stabilizer element 12 as an essentially cylindrical stabilizer housing 18 is merely shown as an example. Rather, a large number of other housing forms are also conceivable.

Figure 2:
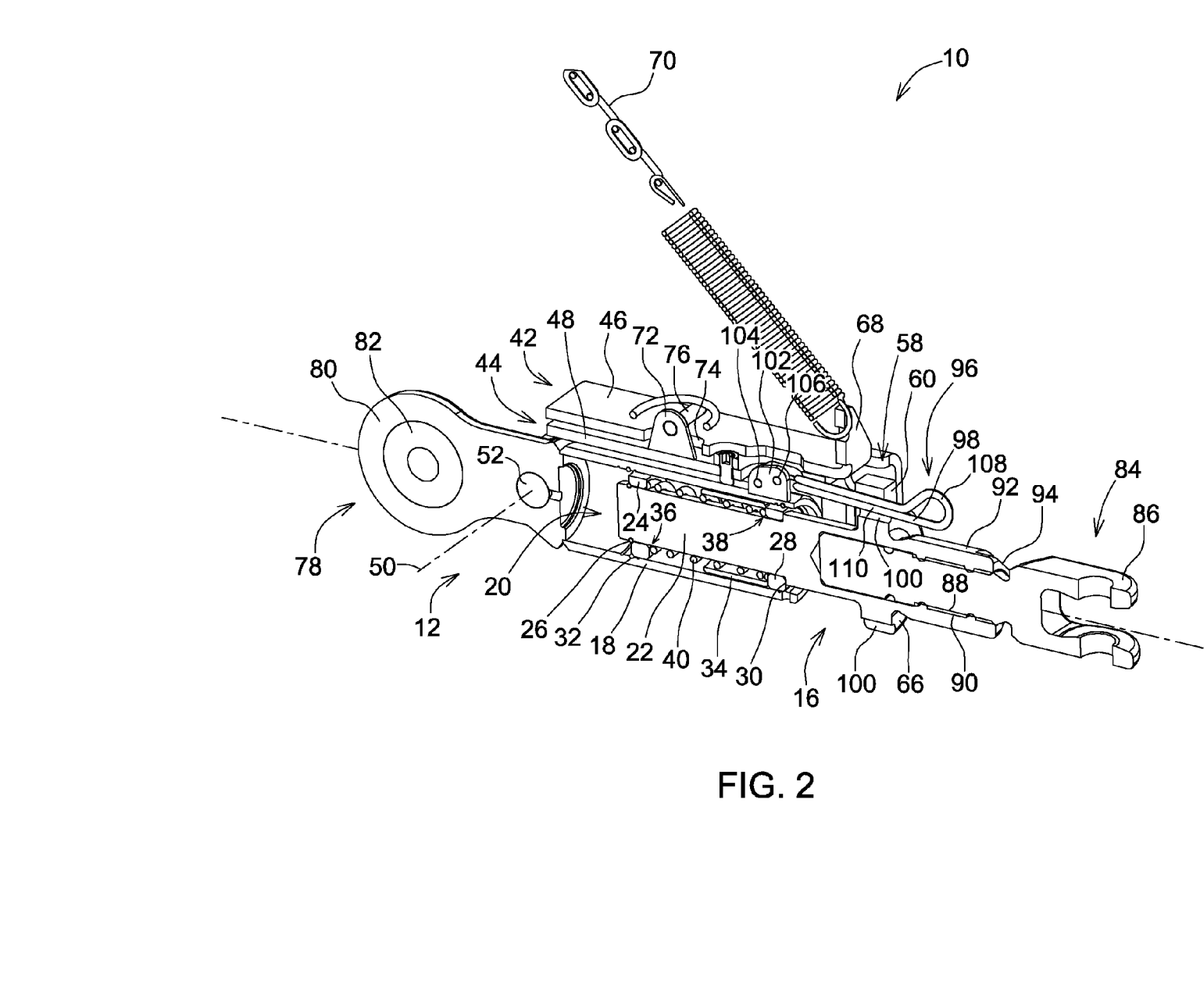
FIG. 2 is a first sectional view of the stabilizer of FIG. 1.

The stabilizer 10 also includes a first limiting member 42, connected with the first stabilizer element 12, and a second limiting member 44 between the two stabilizer elements 12 and 16. The first limiting member 42 is constructed as an outer closing flap 46 and the second limiting member 44 as an inner closing flap 48, wherein the latter is located spatially or runs between the outer closing flap 46 and the first stabilizer element 12, if the outer closing flap 46 and thus the inner closing flap 48 are located in a closed position, shown in FIGS. 1 and 2. As best seen in FIG. 2, a form-and/or force-locking is thereby produced, at least in sections, between the contours of the aforementioned parts 12, 42, and 44.

The two closing flaps 46 and 48 are connected with the first stabilizer element 12 so they can swivel about a common rotational axis 50, running transverse to the longitudinal axis 14 of the stabilizer 10. The rotational axis 50 is formed by a hinge pin 52, which extends through the first stabilizer element 12, on whose free end the two closing flaps 46 and 48 are supported so they can rotate by means of corresponding outer and inner strap hinges 54 and 56.

A first stop 58 is formed by a first flattening 60 provided on the front on the outer closing flap 48, and a second stop 62 by a second flattening 64 provided on the front on the inner closing flap 48. The first or second flattening 60 or 64, provided on the front, represents an individual unilateral stop area for a counter bearing constructed on the second stabilizer element 16 in the shape of a surrounding limiting collar 66. A compression movement of the two stabilizer elements 12 and 16 is permitted until there is contact between the limiting collar 66 and the individual unilateral stop area of the outer or inner closing flap 46 or 48.

Figure 3:
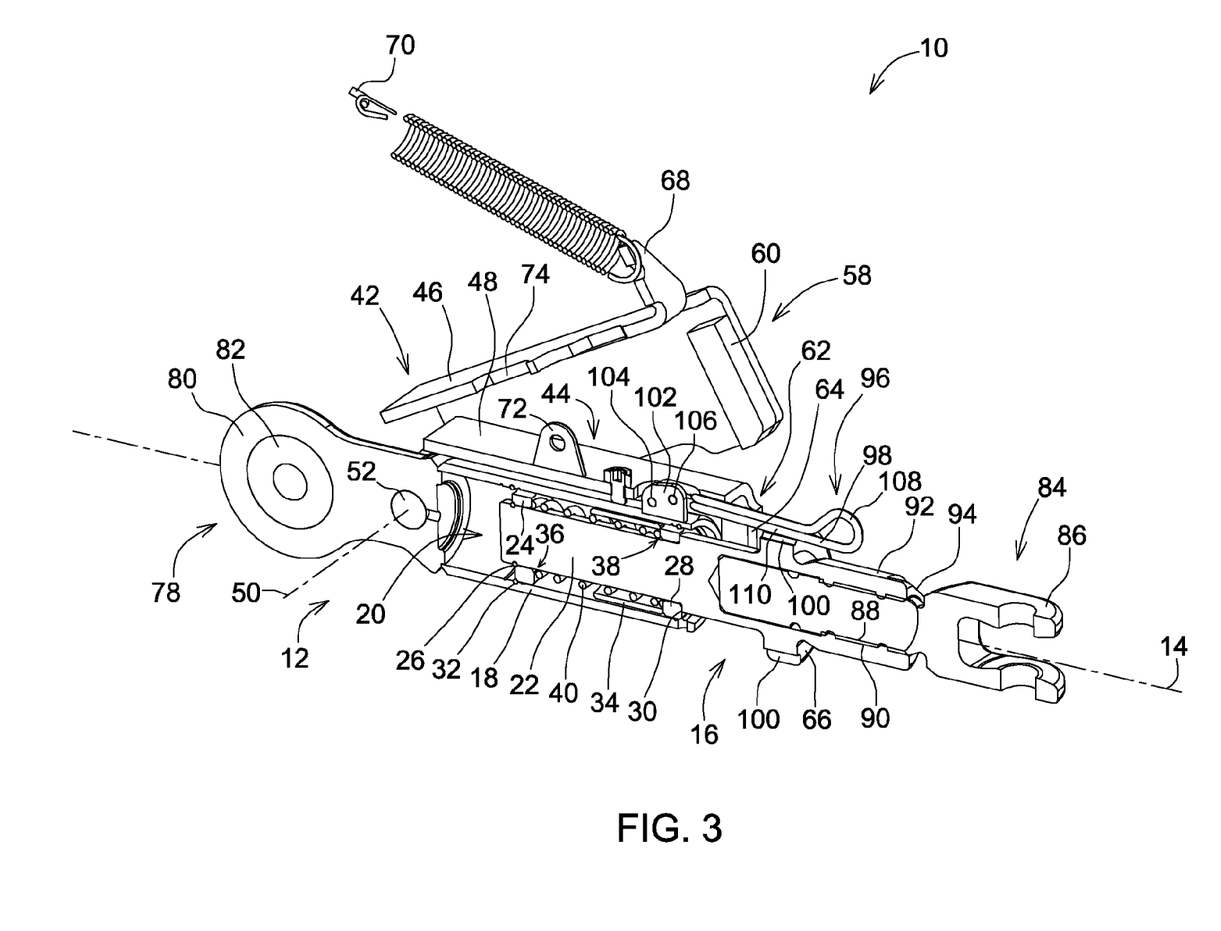
FIG. 3 is a second sectional view of the stabilizer of FIG. 1.
Figure 4:
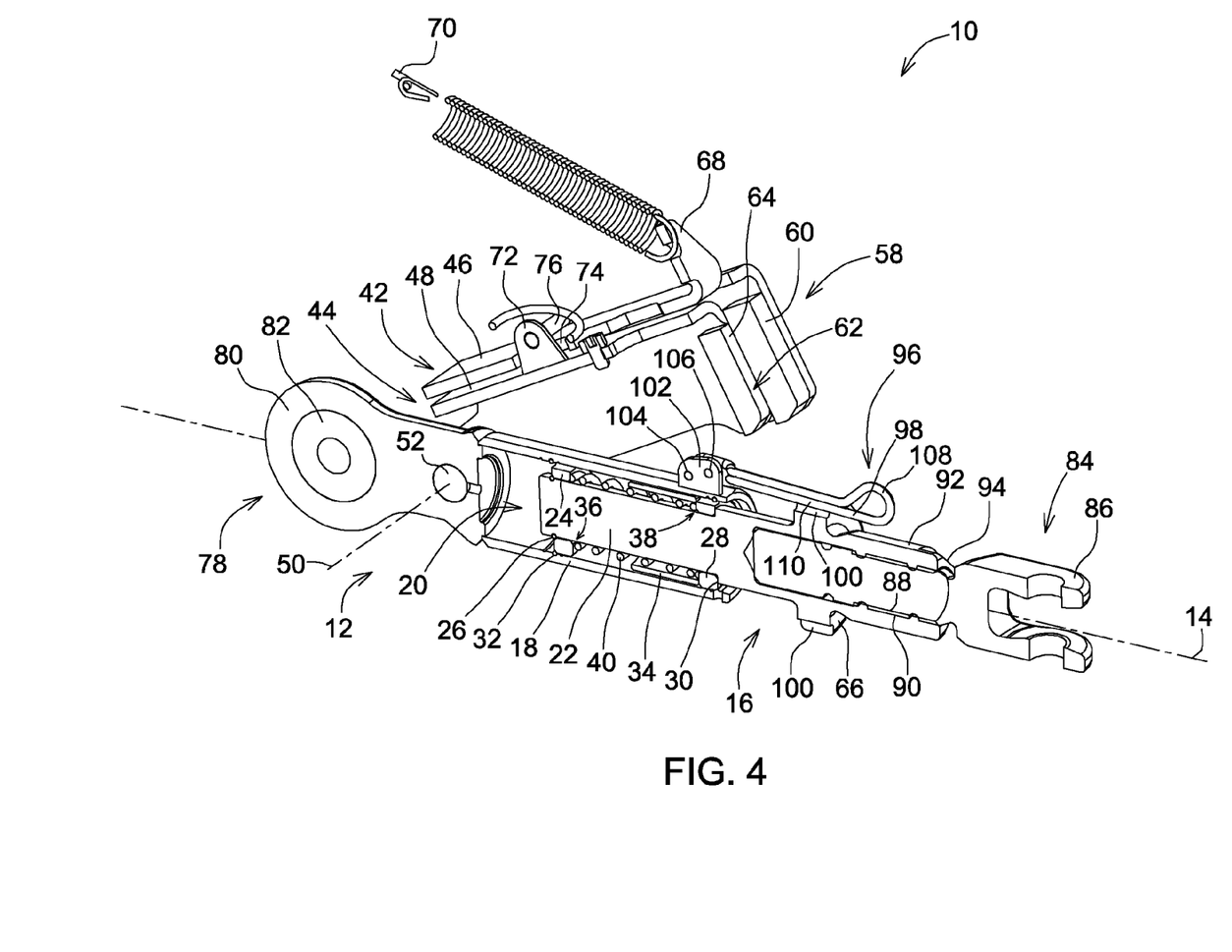
FIG. 4 is a third sectional view of the stabilizer of FIG. 1.

For the gradual release of the stabilizer 10, the outer closing flap 46 is to be swiveled first and subsequently, the inner closing flap 48, in each case, from their closed into an opened position. This sequence is shown in FIGS. 2-4, wherein one can see that the second stop 62, formed by the inner closing flap 48, permits a compression movement that is greater in comparison to the first stop 58, formed by the outer closing flap 46, between the two stabilizer elements 12 and 16.

Generally speaking, in its closed position, the first limiting member 42 forms a first stop 58, interacting with the second stabilizer element 16, to limit a compression movement of the stabilizer elements 12 and 16, wherein the second limiting member 44, provided between the two stabilizer elements 12 and 16, forms a second stop 62 to limit the compression movement in comparison to the corresponding end stop 36 of the stabilizer 10 for the case that the first limiting member 42 is brought into its opened position.

As shown in FIGS. 1 and 2, the outer closing flap 46 encloses, in the closed position, both the inner closing flap 48 as well as the first stabilizer element 12, at least in part. For this purpose, the outer closing flap 46 has the shape of a half-shell, encompassing, in sections, the inner closing flap 48 and the first stabilizer element 12 in their closed position. A similar development is also provided with respect to the inner closing flap 48, so that in their closed position, the two closing flaps 46 and 48 protect at least the first stabilizer element 12, including the suspension mechanism accommodated therein, from the penetration of undesired soiling from the outside.

The outer closing flap 46 can be connected, via a tension strap 68 with a tension chain 70, with a rear fastening site of the tractor (not shown) so as to bring it into the closed position automatically when the lower link is lifted. This is advantageous especially when carrying out transporting trips, since, here, an uncontrolled back and forth swiveling of an implement attached to the three-point hitch is to be prevented.

Moreover, attached to the inner closing flap 48, a coupling element 72 is present, by means of which the inner closing flap 48 can be brought, jointly with the outer closing flap 46, from the closing position to the opened position. The coupling element 72 has the shape of a projection constructed on the inner closing flap 48, which extends through an opening 74 provided on an upper side of the outer closing flap 46, and through which a securing element 76, shown in FIGS. 2 and 4, in the shape of a detachable splint is stuck; its dimensions are selected greater in comparison to the opening 74 in such a way that it moves along the inner closing flap 48 into the opened position when the outer closing flap 46 is lifted.

The two closing flaps 46 and 48 are bent components produced from sheet steel, which have a reinforced stop area for the limiting collar 66.

Thus, the stabilizer 10 is of the so-called single-acting type. This means that it permits a gradual exclusive limitation of a compression movement of the two stabilizer elements 12 and 16, but not of an extension movement. In order to be able to limit the permissible lateral movement of an implement attached to the three-point hitch in both directions, therefore, each of the two lower links of the three-point hitch is correlated with a separate stabilizer 10, working in an opposite direction.

For the production of a tractor-side articulated connection, the first stabilizer element 12 comprises a tie-rod 78.

The tie-rod 78 consists of a fastening eye 80, formed in an end area of the first stabilizer element 12, and a fastening sphere 82, supported so it can rotate therein, which permits a spatial movement of the stabilizer 10 relative to a rear fastening site of the tractor.

Furthermore, the second stabilizer element 16 comprises a fastening leg 84 for the creation of an articulated connection with one of the two lower links of the three-point hitch, wherein the fastening leg 84 has a fastening fork 86 that can be placed on the lower link.

The second stabilizer element 16 is supported so it can rotate relative to the first stabilizer element 12, with reference to the common longitudinal axis 14, wherein an inner thread 88, which is formed within the second stabilizer element 16, meshes on an outer thread 90, formed on the fastening leg 84, so that the stabilizer 10 can be adjusted by rotating the second stabilizer element 16 relative to the first stabilizer element 12, with reference to its entire length.

For the manual rotation actuation of the second stabilizer element 16, there is a gripping area 92. The gripping area 92, provided with an additional tool holder 94, is connected with the second stabilizer element 16 so it cannot rotate.

The limiting collar 66 and the gripping area 92 are a one-piece component of the second stabilizer element 16. The second stabilizer element 16, just like the first stabilizer element 12, is a casting or a forged part made from a suitable steel alloy, which is subsequently appropriately processed to produce precise fits.

In order to prevent an unintended adjustment of the entire length of the stabilizer 10, a rotation of the second stabilizer element 16 can be locked relative to the first stabilizer element 12 by means of a locking element 96.

The locking element 96 comprises a spring clamp 98, which meshes or is pressed into a recess 100 provided on the circumference of the limiting collar 66. The spring clamp 98 can be swiveled out from the recess 100 manually, against a resetting spring force, so that a rotation of the limiting collar 66 is released. A fastening strap 102, located on the first stabilizer element 12, is used to hold the spring clamp 98. The fastening strap 102 has two transverse boreholes 104 and 106 at a distance from one another in the longitudinal direction of the stabilizer 10, wherein each of the two transverse boreholes 104 and 106 holds an open end of the spring clamp 98. The closing flaps 46 and 48 are recessed in the area of the spring clamp 98 so that a swiveling out of the spring clamp 98 is also possible if the closing flaps 46 and 48 are located in the closed position.

To facilitate a manual actuation of the spring clamp 98, it comprises on its free end a gripping area 108, which is expanded to form an eyelet. The resetting spring force is dimensioned in such a way that, on the one hand, a reliable locking of the rotatable limiting collar 66 is guaranteed and, on the other hand, an actuation of the spring clamp 98 without tools remains possible. The spring clap 98 is made from a noncorrosive or an appropriately surface-treated round wire.

The recess 100 is a slit-shaped indentation, which is oriented in the direction of a spring movement between the first stabilizer element 12 and the second stabilizer element 16. The slit-shaped indentation is formed so that it completely holds a meshing segment 110 provided on the spring clamp 98. Since the spring clamp 98 is able to slide along the slit-shaped indentation, a spring movement between the two stabilizer elements 12 and 16 is not prevented.

Here, a large number of recesses 100 are located, distributed along the circumference of the limiting collar 66, so that the entire length of the stabilizer 10 can be gradually adjusted and locked.

Figure 5:
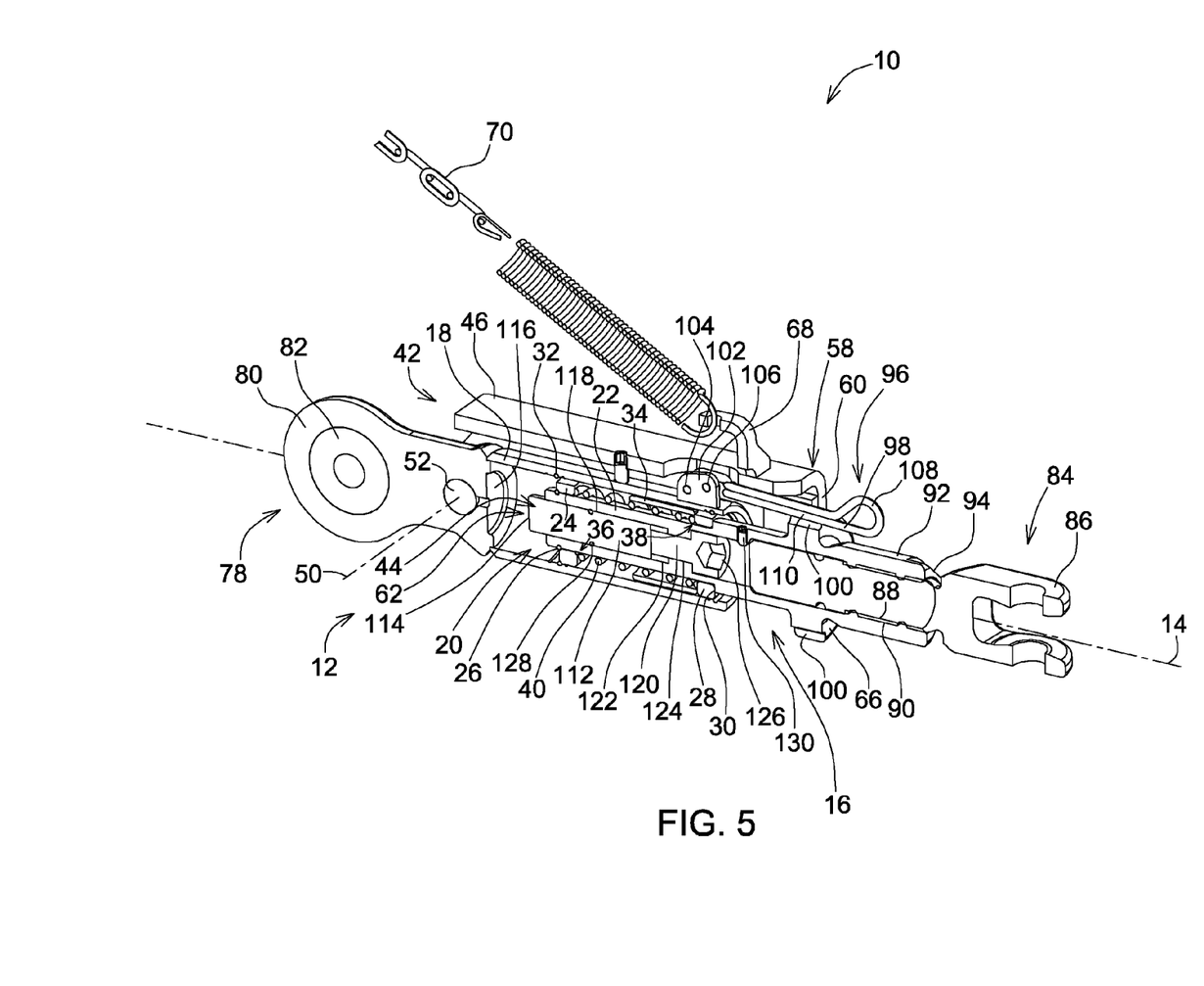
FIG. 5 is a first sectional view of an alternative embodiment of a stabilizer for a lower link of a three point hitch of a tractor.
Figure 6:
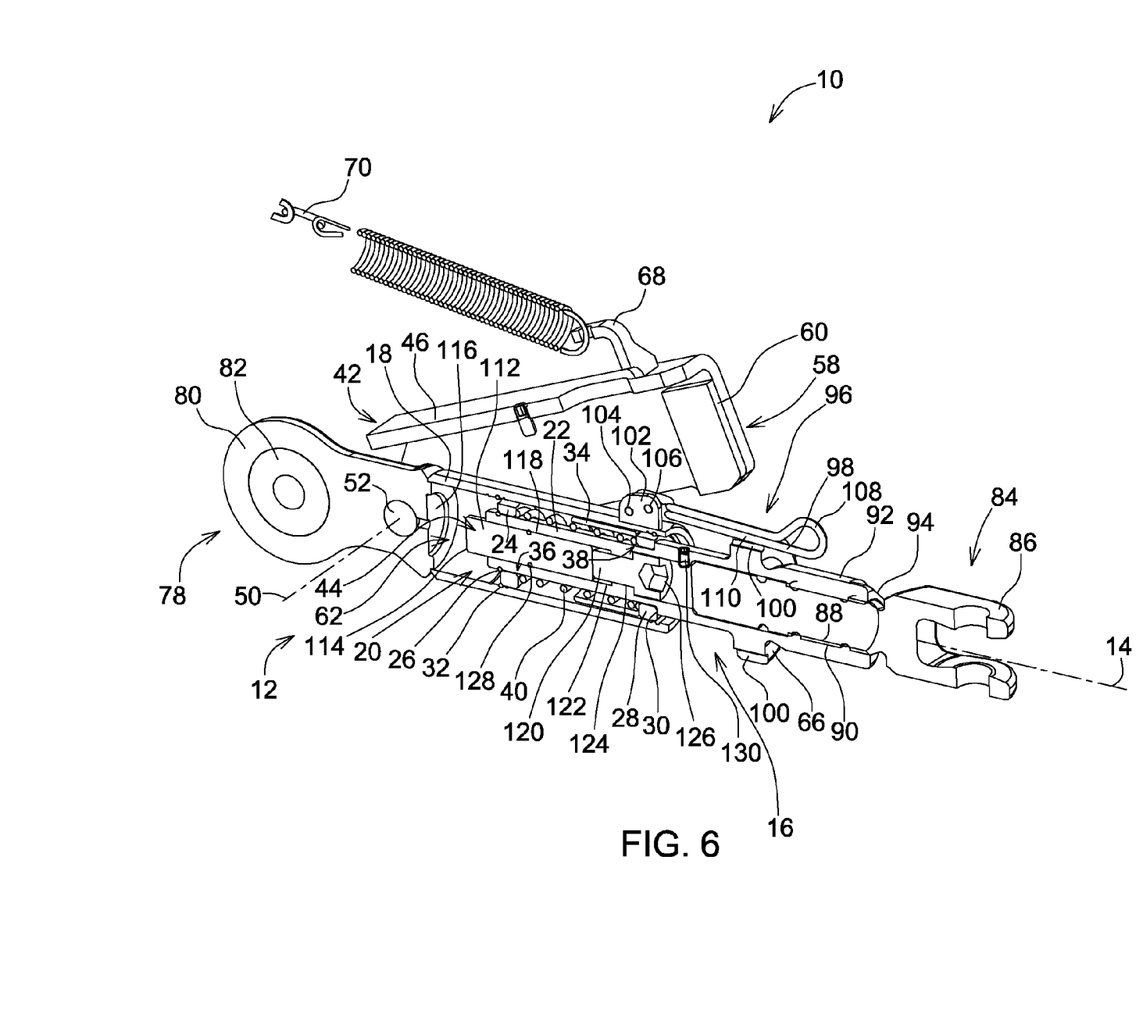
FIG. 6 is a second sectional view of the stabilizer of FIG. 5.

In FIGS. 5 and 6, an alternative embodiment of the stabilizer is shown for a lower link of a three-point hitch of a tractor.

This differs from previously described embodiment in that the second limiting member 44 is constructed as a stop pin 112, which can be adjusted along the longitudinal axis 14 of the stabilizer 10 to variably limit the compression movement. This makes it possible to gradually adapt the position of the second stop 62 and thus the permissible extent of a compression movement between the two stabilizer elements 12 and 16 in a deflection area given by the first stop 58 and the corresponding end stop 36 of the stabilizer 10. The first limiting member 42 is a conventional closing flap 46, wherein it is first brought from the closed into the opened position in accordance with the sequence shown in FIGS. 5 and 6 for the release of the stop pin 112 and thus the second stop 62.

The second stop 62 is formed by a free end 114 of the stop pin 112. Stated more precisely, the free end 110 forms a unilateral stop area for a counter bearing constructed within the second stabilizer element 16 in the shape of a central impact base 116. A compression movement between the two stabilizer elements 12 and 16 is permitted until there is contact between the central impact base 116 and the free end 110 of the stop pin 112.

The stop pin 112 is supported so that it can be moved within a guide borehole 118 constructed along the longitudinal axis 14 of the second stabilizer element 16, wherein a threaded pin 120, which impinges on the stop pin 112, is provided, which comprises a threaded section with an outer thread 122 for the adjustment of the stop pin 112. The threaded pin 120 meshes into a complementary inner thread 124, which is provided along the longitudinal axis 14 of the second stabilizer element 16 so that the position of the free end 110 can be changed by rotating the threaded pin 120 in or out. For this purpose, the threaded pin 120 has a tool holder 126 in the shape of a socket drive on its opposite end.

So as to prevent an unintended adjustment of the stop pin 112 as a result of operation-caused vibrations or the like, the stop pin 112 is carries a movement-inhibiting locking element 128. The locking element 128 is a rubber-elastic O-ring which is received by a circumferential groove on the stop pin 112. The locking element 128 is compressed within the guide borehole 118 of the stop pin 112 so that it makes a movement of the stop pin 112 within the guide borehole 118 difficult as a result of the frictional forces produced by it.

A loss protection device or locking screw 130 runs transverse to the adjustment direction of the threaded pin 120 and limits the adjusting capacity of the threaded pin 120 and prevents an excess screwing of the threaded pin 120 out of the inner thread 124 of the second stabilizer element 16.

In accordance with a non-depicted alternative development, the stop pin 112 itself can be constructed as a threaded pin. In this case, the requirement of a separate stop pin is omitted.

Figure 7:
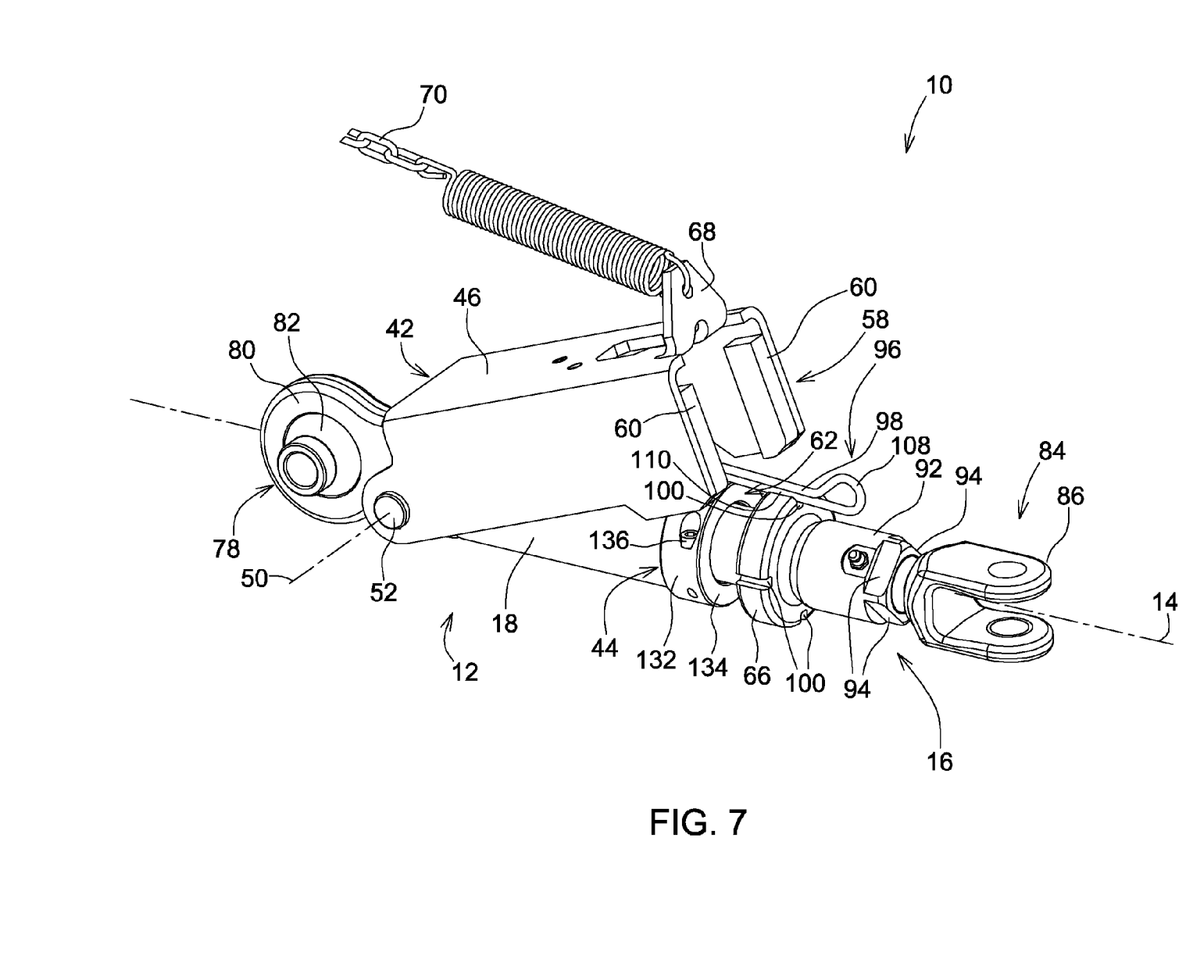
FIG. 7 is a perspective view of another alternative embodiment of a stabilizer for a lower link of a three-point hitch of a tractor.
Figure 8:
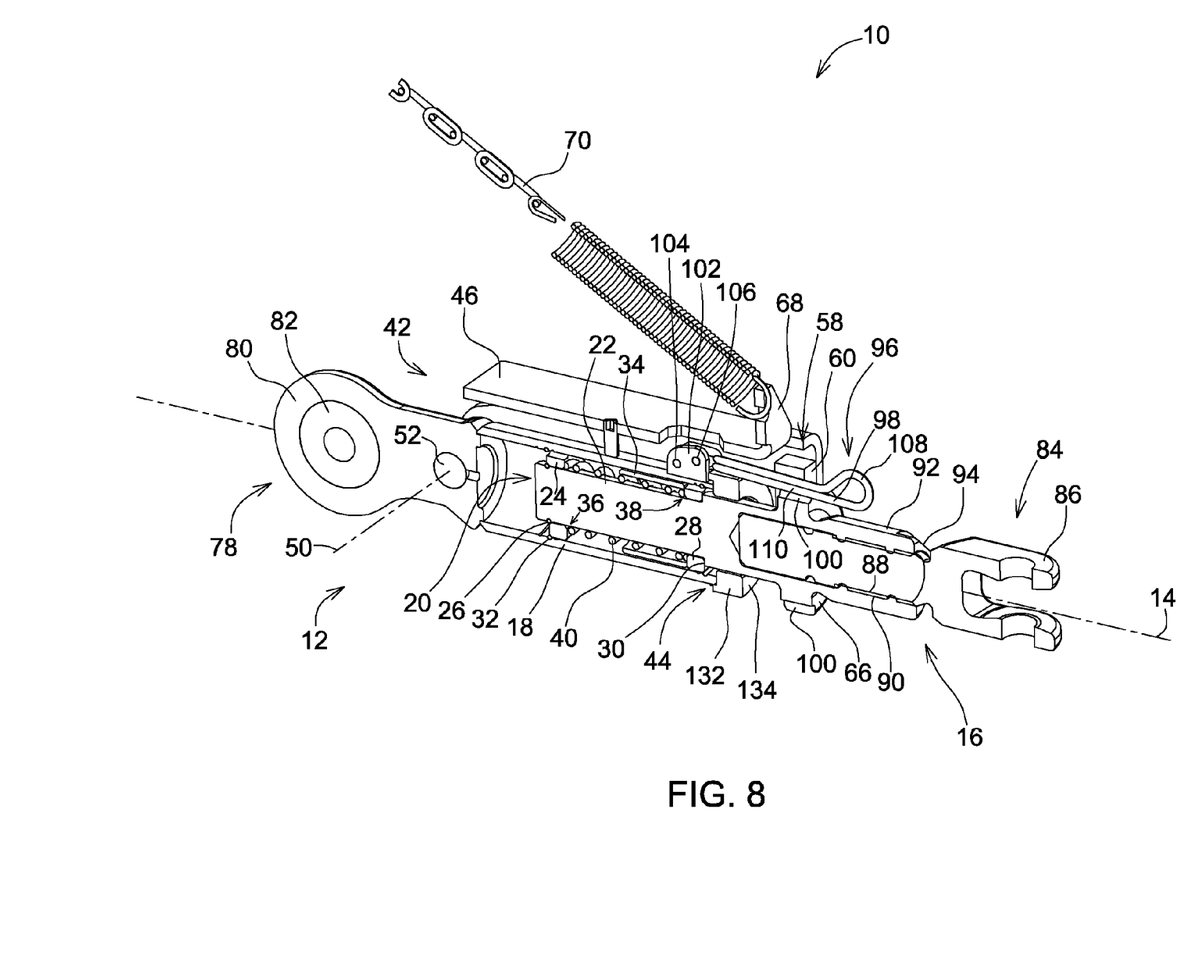
FIG. 8 is a first sectional view of the stabilizer of FIG. 7.
Figure 9:
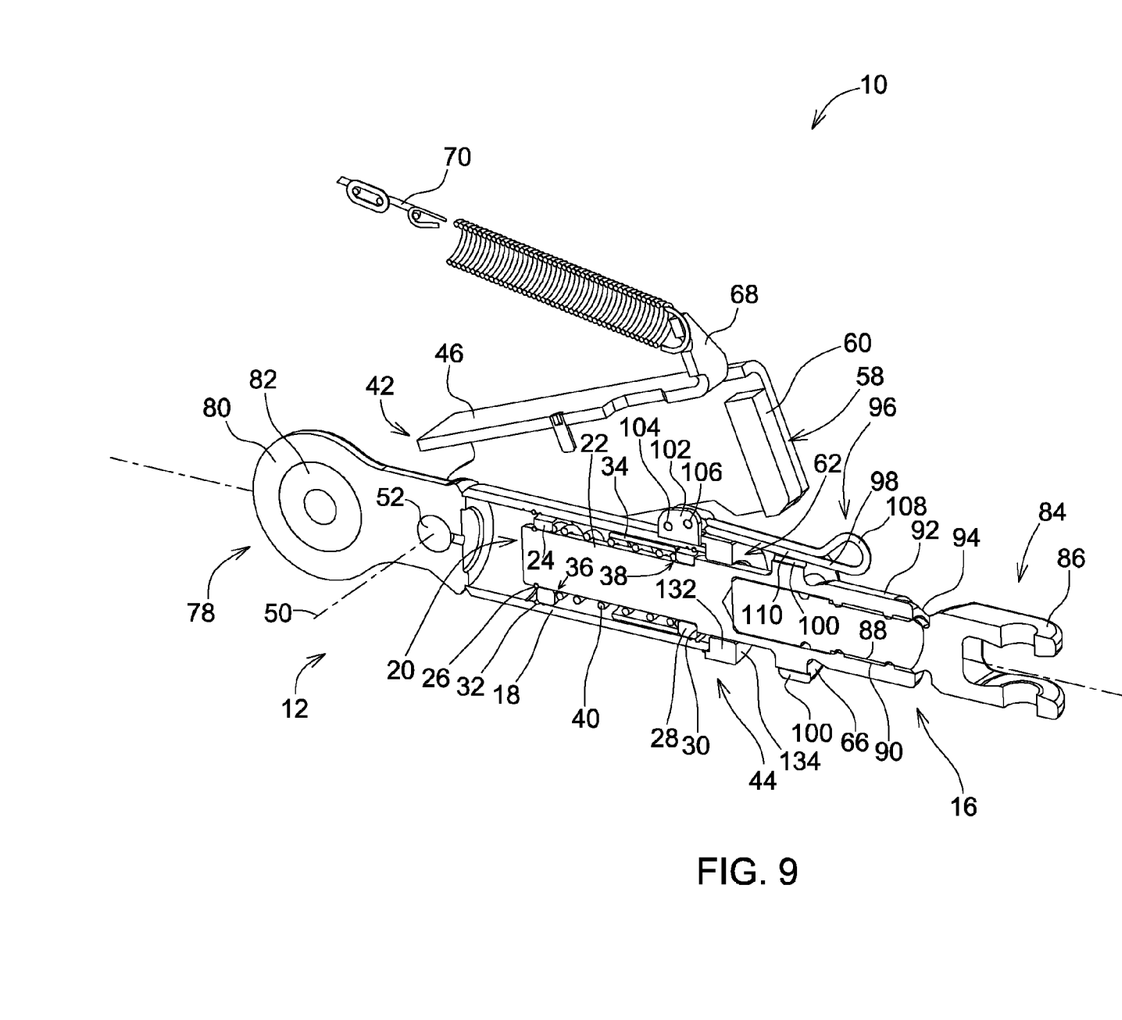
FIG. 9 is a second sectional view of the stabilizer of FIG. 7.
Figure 10:
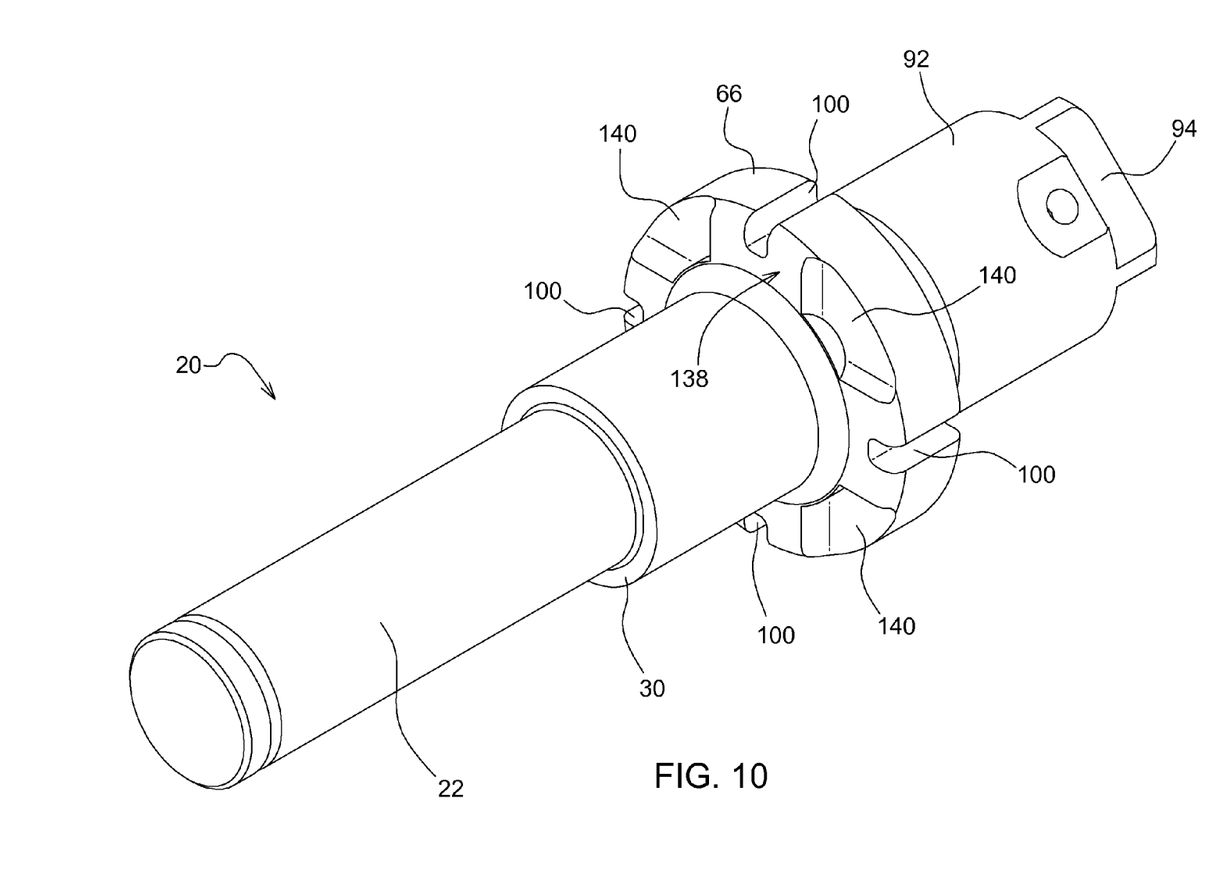
FIG. 10 is a perspective view of an embodiment example of a spring piston for use with the stabilizer embodiments.

FIGS. 7-9 show another alternative embodiment of a stabilizer for a lower link of a three-point hitch of a tractor. This differs from the preceding embodiment examples in that the second limiting member 44 is an intermediate ring 132 located between the two stabilizer elements 12 and 16. The second stop 62 is formed in this case by a flattening 134 provided on the front side on the intermediate ring 132. This represents a unilateral stop area for a counter bearing constructed on the second stabilizer element 16 in the shape of a surrounding limiting collar 66. A compression movement between the two stabilizer elements 12 and 16 is permitted until there is contact between the limiting collar 66 and the flattening 134 provided on the front side. This means that, depending on the thickness of the used intermediate ring 132, it is possible to limit, to a varying extent, the compression movement between the two stabilizer elements 12 and 16. The first limiting member 42 is a conventional closing flap 46, wherein it is to be first brought from the closed into the opened position in the sequence shown in FIGS. 8 and 9 for the release of the intermediate ring 132 and thus of the second stop 62.

For an easier assembly or dismantling, the intermediate ring 132 is constructed in two parts. An assembly element 136, in the shape of a screw connection, is hereby used for the detachable connection of the at least two parts on the first stabilizer element 12.

Optionally, the intermediate ring 132 has an inner thread, which can be screwed on an outer thread, constructed in an end area of the first stabilizer element 12, so that the position of the second stop 62 can be gradually adapted by a corresponding screwing on or off of the intermediate ring 132. As a result of the two-part structure of the intermediate ring 132, it can be braced by means of the assembly element 136 with the outer thread of the first stabilizer element 12 in such a way that it is secured against an unintended rotation.

While the above describes example embodiments of the present disclosure, these descriptions should not be viewed in a limiting sense. Rather, there are several variations and modifications which may be made without departing from the scope of the present invention as defined in the appended claims.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A stabilizer for a lower link of a three-point hitch of a tractor, with a first stabilizer element and a second stabilizer element supported for movement with spring action relative to the first stabilizer element along a common longitudinal axis, wherein a first limiting member is connected with the first stabilizer element, the first limiting member forming a first stop when in a closed position, the first stop interacting with the second stabilizer element to limit compression movement of the two stabilizer elements, characterized in that:
   a second limiting member is between the two stabilizer elements, the second limiting member forming a second stop which limits compression movement relative to a corresponding end stop of the stabilizer when the first limiting member is moved to an opened position; and
   the first limiting member is constructed as an outer closing flap and the second limiting member as an inner closing flap, wherein the two closing flaps are connected with the first stabilizer element so the two closing flaps can swivel about a rotational axis which runs transverse to the longitudinal axis of the stabilizer.

2. The stabilizer of claim 1, wherein:
the first and second stops are formed by a flattening provided on the front side on the outer and/or inner closing flaps.

3. The stabilizer of claim 1, wherein:
in the closed position, the outer closing flap at least partially encloses both the inner closing flap and the first stabilizer element.

4. The stabilizer of claim 1, wherein:
the outer closing flap includes a tension strap which is connected to a rear fastening site of the tractor via a chain.

5. The stabilizer of claim 1, wherein:
a coupling element is placed on the inner closing flap, the coupling element moving the inner closing flap and the outer closing flap from a closed position to an open position.

6. The stabilizer of claim 1, wherein:
the two closing flaps are bent components made of sheet steel.

7. A stabilizer for a lower link of a three-point hitch of a tractor, with a first stabilizer element and a second stabilizer element supported for movement with spring action relative to the first stabilizer element along a common longitudinal axis, wherein a first limiting member is connected with the first stabilizer element, the first limiting member forming a first stop when it is in a closed position, the first stop interacting with the second stabilizer element to limit compression movement of the two stabilizer elements, characterized in that:
   a second limiting member is between the two stabilizer elements, the second limiting member forming a second stop which limits compression movement relative to a corresponding end stop of the stabilizer when the first limiting member is moved to an opened position, the second limiting member comprising a stop pin which is adjustable along the longitudinal axis of the stabilizer to variably limit the compression movement.

8. The stabilizer of claim 7, wherein:
the second stop is formed by a free end of the stop pin.

9. The stabilizer of claim 7, wherein:
the stop pin comprises a threaded pin.

10. The stabilizer of claim 9, wherein:
the threaded pin engages a loss protection device, which limits an adjusting capacity of the threaded pin.

11. The stabilizer of claim 7, wherein:
the stop pin is movable within a guide borehole, which is constructed along the longitudinal axis of the second stabilizer element, and the stop pin is adjusted by a threaded pin which impinges on the stop pin.

12. The stabilizer of claim 11, wherein:
the stop pin carries with a movement-inhibiting locking element.

13. A stabilizer for a lower link of a three-point hitch of a tractor, with a first stabilizer element and a second stabilizer element supported for movement with spring action relative to the first stabilizer element along a common longitudinal axis, wherein a first limiting member is connected with the first stabilizer element, the first limiting member forming a first stop when it is in a closed position, the first stop interacting with the second stabilizer element to limit compression movement of the two stabilizer elements, characterized in that:

a second limiting member is between the two stabilizer elements, the second limiting member forming a second stop which limits compression movement relative to a corresponding end stop of the stabilizer when the first limiting member is moved to an opened position, the second limiting member is an intermediate ring located between the two stabilizer elements, the intermediate ring has an inner thread constructed in an end area of the first stabilizer element, the inner thread can be screwed on so that the position of the second stop can be gradually adapted by a corresponding screwing on or off of the intermediate ring.

* * * * *